(12) United States Patent
Ichikawa et al.

(10) Patent No.: US 7,025,341 B2
(45) Date of Patent: Apr. 11, 2006

(54) PNEUMATICALLY OPERATED FLUID FILLED ENGINE MOUNT FOR VEHICLES

(75) Inventors: Hiroyuki Ichikawa, Kani (JP); Syouji Akasa, Ichinomiya (JP); Masaaki Hamada, Konan (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/810,042

(22) Filed: Mar. 26, 2004

(65) Prior Publication Data

US 2004/0188904 A1 Sep. 30, 2004

(30) Foreign Application Priority Data

Mar. 27, 2003 (JP) .............................. 2003-087031

(51) Int. Cl.
*F16F 13/00* (2006.01)
(52) U.S. Cl. .............................. 267/140.14; 267/140.15
(58) Field of Classification Search ........... 267/140.11, 267/140.13, 140.14, 140.15; 248/560, 562, 248/566, 636, 638
See application file for complete search history.

(56) References Cited

U.S. PATENT DOCUMENTS

| | | | | |
|---|---|---|---|---|
| 5,314,173 A | * | 5/1994 | Ide et al. ............... | 267/140.14 |
| 5,839,720 A | * | 11/1998 | Kojima ................... | 267/140.14 |
| 5,911,412 A | * | 6/1999 | Durand et al. .......... | 267/140.13 |
| 5,992,833 A | * | 11/1999 | Tanahashi ............... | 267/140.14 |
| 6,082,717 A | | 7/2000 | Nanno ................... | 267/140.14 |
| 6,371,462 B1 | * | 4/2002 | Gennesseaux ......... | 267/140.13 |

FOREIGN PATENT DOCUMENTS

| | | | |
|---|---|---|---|
| JP | 587178 A | * | 4/1993 |
| JP | 10-184769 | | 7/1998 |
| JP | 2000-213586 | | 8/2000 |

* cited by examiner

*Primary Examiner*—Melody M. Burch
(74) *Attorney, Agent, or Firm*—Beyer Weaver & Thomas LLP

(57) ABSTRACT

A fluid filled engine mount including: a pressure-receiving chamber and an equilibrium chamber connected via a first orifice passage tuned to excite resonance of fluid flowing therethrough to engine shakes; a partition rubber plate partially defining a pressure receiving chamber and tuned to perform absorption of a fluid pressure fluctuation in the pressure-receiving chamber to booming noises; an oscillating chamber connected to the pressure receiving chamber via a second orifice passage tuned to excite resonance of the fluid flowing therethrough to idling vibrations; an oscillating rubber elastic plate having an expansion spring smaller than that of the partition rubber plate and defining the oscillating chamber; a working air chamber applied with air pressure fluctuation with a frequency corresponding to the idling vibration during idling, and to make the working air chamber atmospheric pressure during running.

3 Claims, 3 Drawing Sheets

PNEUMATICALLY OPERATED FLUID FILLED ENGINE MOUNT FOR VEHICLES

The disclosure of Japanese Patent Application No. 2003-087031 filed on Mar. 27, 2003 including the specification, drawings and abstract is incorporated herein by reference in its entirety.

BACKGROUND OF THE INVENTION

1. Field of the Invention

The present invention relates generally to an automotive fluid-filled engine mount capable of exhibiting vibration damping effect or action based on flow or pressure action of non-compressible fluid sealed therein. More specifically, the present invention is concerned with such a fluid-filled engine mount of novel structure that is capable of providing effective vibration damping or isolating effect against input vibration of a plurality or a wide range of frequency bands by properly using, in accordance with the input vibration, a passive vibration damping effect based on the flow of the non-compressible fluid, and an active vibration isolation effect based on control of pressure fluctuation of the non-compressible fluid, on the basis of air pressure action exerted thereon from the outside.

2. Description of the Related Art

Vibrations (including noises induced by the vibrations) in a body or various components of an automotive vehicle often become a major problem, and, in order to isolate such vibrations, an engine mount for suppressing the vibration transmission from a power unit, which is one of the sources of vibration, to the body has been conventionally employed.

As one type of such vibration damping devices, known is a fluid-filled engine mount having a non-compressible fluid sealed within a fluid chamber thereof and which provides passive vibration damping effect by utilizing resonance of the non-compressible fluid that is forced to flow therein upon the input of vibration. Recently, aiming to further improve the vibration damping performance, a proposal has been made for providing active vibration damping action by adopting an electromagnetic drive unit for oscillating a part of the wall portion of the fluid chamber filled with the non-compressible fluid, and controlling the fluid pressure in the chamber by oscillating a part of the wall portion with a frequency corresponding to the vibration to be isolated, as disclosed inter alia in Citation 1 listed below.

However, this type of active fluid-filled engine mount must be assembled with coils, permanent magnets and other needed components in order to structure the electromagnetic drive unit. Therefore, the number of components will increase, and the construction of the device will become extremely complex, making the assembly procedure become troublesome, and increasing the manufacturing costs. Additional problem is that it is difficult to avoid the significant increase in weight and size of the overall engine mount.

In light of the above, a proposal has been made to employ a pneumatic actuator instead of an electromagnetic drive unit for controlling the pressure of the sealed fluid, as described in Citation 2 listed below, for example. In other words, since a pneumatic actuator can be realized with a simple and compact structure by employing the negative pressure and atmospheric pressure generated in an air intake system of an automotive internal combustion engine. As a result of adopting this pneumatic actuator, the simplification and miniaturization of the fluid-filled engine mount can be established, and the simplification of manufacture and decrease in manufacturing costs can also be accomplished.

Extensive studies conducted by the present inventors revealed that this pneumatic oscillation system has major problems. Namely, although the electromagnetic drive unit will enable the highly precise generation of oscillation of an approximate sine waveform corresponding to the vibration to be damped by controlling the conductive current to the coil, the pneumatic actuator does not provide the same performance. That is, since the pneumatic actuator basically generates an oscillatory force by alternately connecting the working air chamber to a vacuum source and the atmospheric pressure upon employing a solenoid operated valve, the generated oscillatory force will become an ON/OFF-like rectangular waveform. Thus, the generated oscillatory force is depart from the waveform of the vibration to be damped, and the pressure fluctuation generated by means of the non-corresponding portions of the waveform may possibly cause, for example, a pressure fluctuation component of a high order, leading to a likelihood of aggravation of vibration damping performance in frequency band of high order.

In an automotive engine mount, particularly, input vibration will differ according to the running conditions of the vehicle. When the vehicle is running, low-frequency large-amplitude vibrations such as engine shakes and high-frequency small-amplitude vibrations such as booming noises often become problems. When the vehicle is idling, medium-frequency medium-amplitude vibrations such as idling vibrations often become problems. That is, the engine mount has a characteristic that the vibrations to be damped span across a wide frequency band. Incidentally, an engine mount comprising a pneumatic actuator having a simple and compact structure as described above has not yet realize an effective measure for providing effective vibration damping effect for all vibrations of such wide frequency bands.

Citation 1 JP-A-2000-213586
Citation 2 JP-A-10-184769

SUMMARY OF THE INVENTION

It is therefore an object of the invention to provide a fluid-filled engine mount having a simple and compact structure, and which is capable of exhibiting effective vibration damping effects against low-frequency vibrations such as engine shakes, medium-frequency vibrations such as idling vibrations, and high-frequency vibrations such as booming noises by employing active vibration damping action.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention is a fluid filled engine mount for an automotive vehicle, comprising: (a) a first mounting member fixable to a power unit side of the vehicle; (b) a second mounting member fixable to a body side of the vehicle, and disposed spaced away from the first mounting member; (c) an elastic body for elastically connecting the first mounting member and the second mounting member; (d) a pressure receiving chamber filled with non-compressible fluid and partially defined by the elastic body so as to excite fluid pressure fluctuation upon input of vibration; (e) an equilibrium chamber filled with the non-compressible fluid and partially defined by a flexible layer so as to permit change in volume; (f) a first orifice passage for connecting the equilibrium chamber to the pressure receiving chamber, and tuned so as to excite resonance of the fluid flowing therethrough between the pressure-receiving and the equilibrium chambers in a vibration frequency range of a low-frequency large-amplitude such as engine shakes; (g) a partition rubber plate partially defining the pressure receiving chamber, and tuned so as to perform absorption of the fluid pressure fluctuation of the pressure-receiving chamber in a vibration frequency range of a high-frequency small-amplitude such as booming noises in a vehicle running state; (h) an oscillating chamber filled with the non-compressible fluid formed on an opposite side across from the partition rubber plate in relation to the pressure receiving chamber; (i) a second orifice passage for connecting the oscillating chamber to the pressure receiving chamber, and tuned so as to excite resonance of the fluid flowing therethrough between the oscillating chamber and the pressure receiving chamber in a vibration frequency range of a medium-frequency medium-amplitude such as idling vibrations; (j) an oscillating rubber elastic plate having an expansion spring smaller than that of the partition rubber plate and partially defining the oscillating chamber; (k) a working air chamber formed on an opposite side across from the oscillating rubber elastic plate in relation to the oscillating chamber; (l) an air pressure passage connected to the working air chamber for externally controlling air pressure in the working air chamber; and (m) an air pressure control unit for controlling the air pressure exerted to the working air chamber through the air pressure passage so as to exert air pressure fluctuation to the working air chamber with a frequency corresponding to the idling vibration in a vehicle idling state, and to make the working air chamber an approximate atmospheric pressure during the vehicle running state.

With the fluid-filled engine mount constructed according to this mode, while the vehicle is stopped, the oscillating rubber elastic plate is oscillated with a frequency corresponding to the idling vibration by means of the air pressure fluctuation exerted in the working air chamber, so that fluid pressure fluctuation is generated thereby in the oscillating chamber. With this state, the non-compressible fluid is forced to flow through the second orifice passage based on the relative pressure difference between the pressure receiving chamber and the oscillating chamber. The pressure fluctuation of the oscillating chamber is efficiently exerted to the pressure-receiving chamber with the help of the resonance of the fluid flowing through the second orifice passage. As a result of the pressure receiving chamber being subject to active pressure control, relative or positive vibration isolation effects are provided against the vibration input between the first mounting member and the second mounting member.

While the vehicle is running, low-frequency vibrations such as engine shakes and high-frequency vibrations such as booming noises most often become problems. With respect to low-frequency vibrations, passive vibration damping effects are advantageously generated based on the resonance of the fluid flowing through the first orifice passage on the basis of the relative pressure fluctuation induced between the pressure receiving chamber and the equilibrium chamber pursuant to the input of such low-frequency vibration.

Further, with respect to high-frequency vibrations, the first orifice passage will substantially be in a closed state. Since the amplitude of the high-frequency vibration is sufficiently small, the pressure fluctuation of the pressure receiving chamber induced pursuant the high-frequency vibration can be absorbed and reduced on the basis of the elastic deformation of the partition rubber plate partially defining the pressure receiving chamber, thereby exhibiting active vibration isolating effects based on low dynamic spring characteristics of the engine mount.

That is, the engine mount according to this mode utilizes the pneumatic actuator having a compact and simple structure to exhibit excellent vibration damping or isolating effects for various vibrations across a wide range of frequency bands from low frequency to medium frequency and high frequency.

In addition, since the expansion spring of the oscillating rubber elastic plate is made smaller than that of the partition rubber plate, when exerting oscillatory force to the oscillating rubber elastic plate and generating pressure fluctuation in the oscillating chamber in order to isolate medium-frequency vibrations such as idling vibrations, effectively suppressed is absorption of the pressure fluctuation in the oscillating chamber based on the elastic deformation of the partition rubber elastic plate. Thus, an effective pressure fluctuation can be generated on the oscillating chamber. As a result, the amount of fluid flowing through the second orifice passage can be secured, and the active vibration isolation effects based on the pressure transmission via the second orifice passage will be effectively exhibited. Incidentally, as a result of the second orifice passage being tuned to a medium-frequency range, this second orifice passage functions as a low pass filter so as to suppress the transmission of secondary, tertiary, or even higher harmonic components of the target medium-frequency vibration to the pressure receiving chamber. Thus, the engine mount of this mode can exhibit desired active vibration damping or isolation effects with further stability owing to suppression of the transmission of such high harmonic components to the pressure receiving chamber will be exhibited with further stability.

Further, when low-frequency large-amplitude vibrations such as engine shakes are exerted while the vehicle is running, the amount of elastic deformation of the partition rubber plate will be suppressed with the large spring rigidity thereof, absorption of the pressure fluctuation in a low-frequency range of the pressure receiving chamber pursuant to the elastic deformation of the partition rubber plate per se can be avoided, whereby an effective pressure fluctuation can be generated in the pressure receiving chamber. As a result, the amount of fluid flowing through the first orifice passage will be secured, and the passive vibration damping effects based on resonance of the fluid can be exhibited with even further effectiveness.

Still further, when high-frequency small-amplitude vibrations such as booming noises are exerted while the vehicle is running, although the first and second orifice passages will substantially be in a closed state, as a result of a minute elastic deformation of the partition rubber plate being allowed, the minute pressure fluctuation induced in the pressure receiving chamber will be absorbed, and favorable vibration isolation effects will be exhibited.

Therefore, the engine mount according to this mode realizes a simple yet compact overall structure with only a small number of components by employing a pneumatic actuator, and is capable of providing effective vibration isolating or damping effects upon suitably adopting either active vibration isolating effects or passive vibration isolating effects against vibrations across a wide range of frequency bands from a low-frequency band to a medium-frequency band and even a high-frequency band. Moreover, in the present mode, the expansion spring corresponds to the size of pressure fluctuation exerted on the chamber wall portion required for changing the chamber in an amount of a unit capacity.

A second mode of the invention is a fluid-filled engine mount according to the first mode described above, wherein the second mounting member is formed as a cylindrical body, the first mounting member is disposed spaced away from one of opposite openings of the second mounting member, the first mounting member and second mounting member are connected with an elastic body so as to fluid-tightly close the one of the opposite openings of the second mounting member and to fluid-tightly close an other one of the opposite openings of the second mounting member with a flexible layer, the engine mount further comprising: a first partition member and a second partition member mutually superimposed in the axial direction inside the second mounting member and securely supported with the second mounting member so as to form the pressure receiving chamber between the first partition member and the elastic member and to form the equilibrium chamber between the second partition member and the flexible layer, wherein a recess provided to a superimposing face side of the second partition member in relation to the first partition member is fluid-tightly closed with the elastic oscillating plate so as to form the working air chamber and to form the oscillating chamber between the elastic oscillating plate and the first partition member; and the aperture provided to the first partition member for partitioning the oscillating chamber and the pressure receiving chamber is fluid-tightly blocked with the partition rubber plate.

The fluid-filled engine mount constructed according to the present mode is capable of forming, in an efficient arrangement, the pressure receiving chamber, equilibrium chamber and oscillating chamber filled with non-compressible fluid, as well as the working air chamber subject to external air pressure fluctuation. As a result, the fluid-filled engine mound defined in accordance with the present invention may be miniaturized even further.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
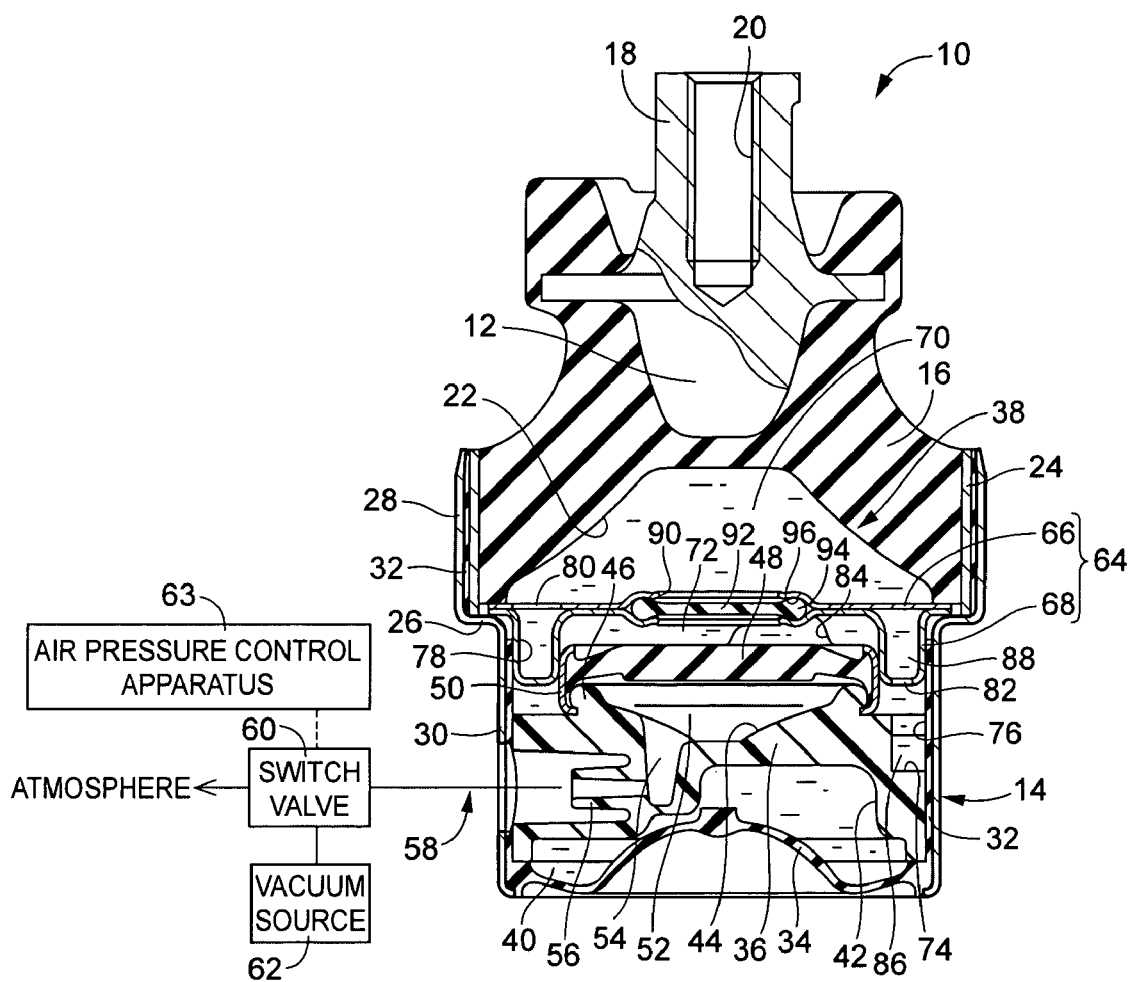
FIG. 1 is an elevational view in axial or vertical cross section of a fluid filled engine mount constructed according to one embodiment of a fluid-filled engine mount of the present invention.
Figure 2:
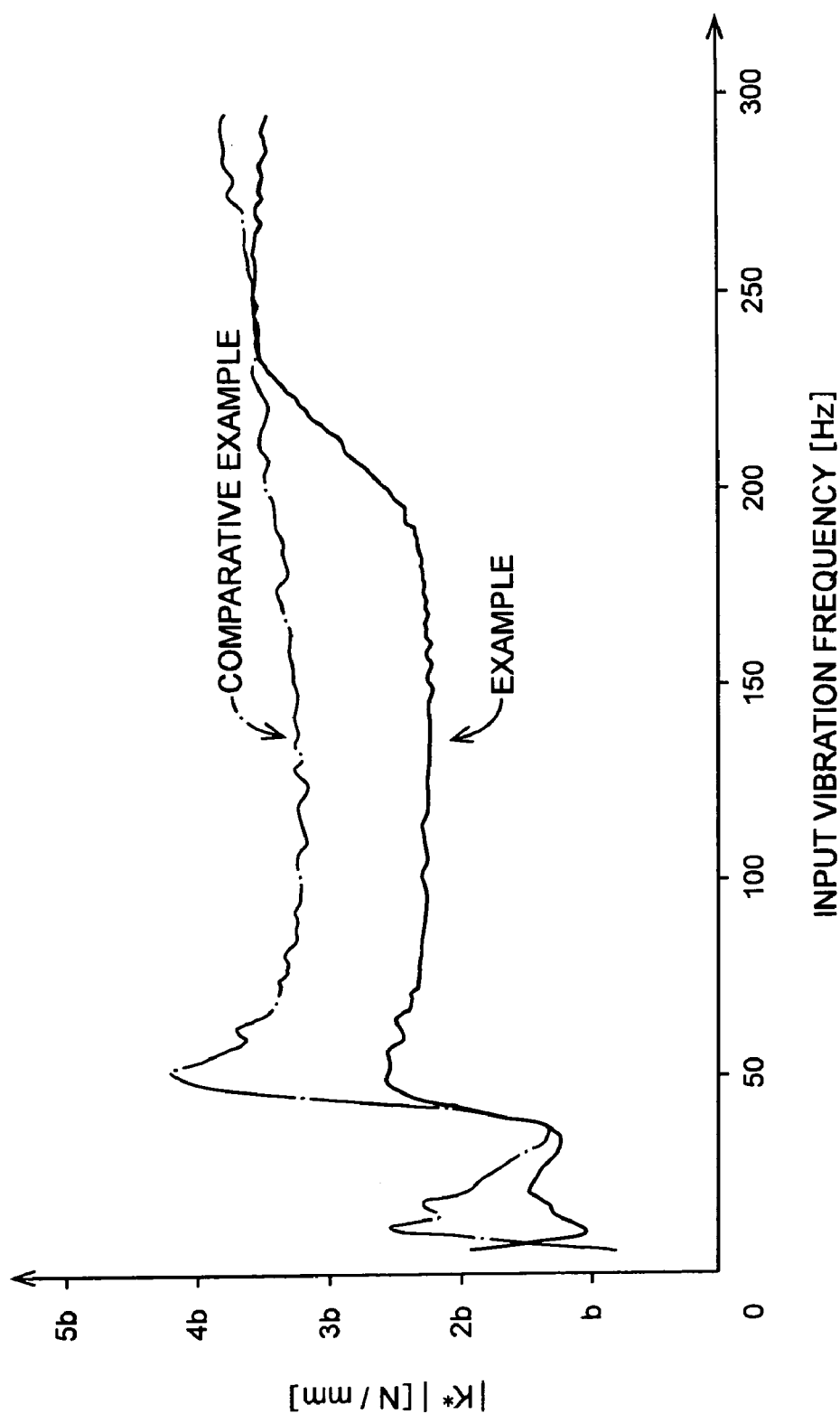
FIG. 2 is a graph showing passive damping characteristics of the engine mount of FIG. 1, together with that of a comparative example.

Referring first to FIGS. 1 and 2, shown is an engine mount 10 for use in automotive vehicles, which is constructed according to one preferred embodiment of the present invention. The engine mount 10 includes a first mounting member 12 and a second mounting member 14, which are both made of metal. The first and second mounting members 12, 14 are disposed spaced away form each other, and elastically connected together by means of a rubber elastic body 16 interposed therebetween. As a result of the first mounting member 12 being mounted onto a power unit side of the vehicle, and the second mounting member 14 being mounted onto a body side of the vehicle, the power unit is elastically mounted on and supported by the body in a vibration damping fashion. In the following description, the vertical direction shall be basically equal to the vertical direction as seen in FIG. 1.

Described in detail, the first mounting member 12 is formed in an approximate inverted truncated conical shape, and has a nut portion 18 integrally formed at a large diameter end thereof so as to protrude in an axially upward direction. As a result of a bolt (not shown) being screwed into a tapped hole 20 of the nut portion 18, the first mounting member 12 is mounted onto the power unit side.

Further, the elastic body 16 is bonded to the first mounting member 12 through vulcanization process of a rubber material for forming the elastic body. The elastic body 16 is formed in an approximate conical trapezoid of a large diameter in its entirety and wherewith the diameter expands downward, and also possesses a recess portion 22 having an inverted cone-shaped hollow opening in the large diameter end face thereof. The first mounting member 12 is bonded to the elastic body 16 in a state of being disposed in a concentric relationship, and being inserted axially downward from the end face of the small diameter side of the elastic body 16. Further, a metal sleeve 24 of a large diameter cylindrical shape is superimposed onto and bonded through the vulcanization process to the outer circumferential surface of the large diameter end portion of the elastic body 16.

On the other hand, the second mounting member 14 is of a stepped cylindrical shape with a relatively large diameter, having a shoulder portion 26 formed at its axially intermediate portion. An axially upper side of the shoulder portion 26 is made to be a large diameter portion 28, and an axially lower side of the shoulder portion 26 is made to be a small diameter portion 30, with the shoulder portion 26 axially interposed between the large and small diameter portions 28, 26. Further, the inner circumferential surfaces of the large diameter portion 28 and small diameter portion 30 are respectively provided with, a thin sealing rubber layer 32 covering approximately the entire surface, and bonded thereto through a vulcanization process of a rubber material. The small diameter side or lower opening of the second mounting member 14 is provided with a diaphragm 34 formed from a thin rubber film having a thin discoid shape. As a result of an outer peripheral edge of this diaphragm 34 being bonded by vulcanization to the peripheral edge of the lower opening, the lower opening of the second mounting member 14 is surely fluid-tightly closed. In the present embodiment, the diaphragm 34 is formed integrally with the sealing rubber layer 32, and a flexible layer is formed with this diaphragm 34.

The large diameter end portion 28 of the second mounting member 14 is superimposed onto the metallic sleeve 24, and is fitted and secured thereon by press fitting or drawing processing, whereby the second mounting member 14 is fixed onto the outer circumferential surface of the elastic body 16. Thereby, the first and second mounting members 12, 14 may be positioned approximately on the same central axis, which will become a primary vibration input direction, and these are disposed in mutually spaced away and elastically connected state. Moreover, as a result of the large diameter portion 28 of the second mounting member 14 being fixed to the elastic body 16, the upper opening of the second mounting member 14 is fluid-tightly closed by the elastic body 16.

In addition, a support member such as a bracket (not shown) is also built in the second mounting member 14. With the support member being fixed to the body of the vehicle (not shown) by means of a bolt or the like, the second mounting member 14 may be securely mounted onto the body.

Moreover, the second mounting member 14 houses a partition member 36 in the small diameter portion thereof such that the partition member 36 is disposed between the opposing faces of the elastic body 16 and the diaphragm 34. This partition member 36 is made of rigid materials such as metal or synthetic resin, and in a block shape of a thick discoid. This partition member 36 is engaged with the small diameter portion 30 of the second mounting member 14, with its outer circumferential surface fluid-tightly and cohesively securely fixed to the inner circumferential surface of the small diameter portion 30 via the sealing rubber layer 32 compressed therebetween. As a result of the partition member 36 being assembled within the second mounting member 14 as described above, the area formed between the elastic body 16 and the diaphragm 34 and hermetically sealed from exterior space is partitioned in a fluid tight manner with the partition member 36. Thus, a primary fluid chamber 38 partially defined by the elastic body 16 is formed in the upper part of the partition member 36, and an equilibrium chamber 40 partially defined by the diaphragm 34 is formed at the lower part of the partition member 36. The equilibrium chamber 40 is designed to readily allow the capacity change based on the deformation of the diaphragm 34.

The primary fluid chamber 38 and the equilibrium chamber 40 are respectively sealed upon being filled with non-compressible fluid such as water, alkylene glycol, polyalkalyene glycol, silicon oil and the like. In the present embodiment, a low-viscosity fluid having a viscosity of 0.1Pa·s or less is preferably adopted in order to yield the advantages of the vibration damping effects based on resonance of the fluid which will be described later. Further, the partition member 36 has a lower recess 42 opening in a central portion of the lower end face thereof, whereby the capacity of the equilibrium chamber 40 is advantageously secured with this lower recess 42.

The partition member 36 also has a cone-shaped central recess 44 opening in a central portion of the upper end face thereof serving as a superimposing face side thereof in relation to a first partition member described later. Moreover, a circumferential engaging projection 46 protruding upward of the partition member 36 is formed integrally to the opening peripheral edge of the central recess 44. An oscillating rubber elastic plate 48 having a discoid shape of a prescribed thickness is superimposed on the opening of the central recess 44, and a metallic cylindrical fixture 50 is bonded through vulcanization process of a rubber material to the outer circumferential surface of the oscillating rubber elastic plate 48. The cylindrical fixture 50 is fitted onto the engaging projection 46 of the partition member 36 at the lower end opening thereof, and is fluid-tightly caulked to the engaging projection 46. As a result, the opening of the central recess 44 is fluid-tightly closed by the oscillating rubber elastic plate 48, whereby a working air chamber 52 that is independent from the primary fluid chamber 38 and equilibrium chamber 40 is formed. As described later, the working air chamber 52 is designed to be applied with air pressure fluctuation from an external air pressure source, whereby oscillatory force is exerted to the oscillating rubber elastic plate 48 based on the air pressure fluctuation of the working air chamber 52.

Furthermore, an air passage 54 is formed in the partition member 36, and one opening end of this air passage 54 is open in the central recess and communicates with the working air chamber 52, and the other end of the air passage 54 is open in a port 56 protrusively provided onto the outer circumferential surface of the partition member 36. In a state where the mount is installed, an external air conduit 58 is connected to this port 56, and a switch valve 60 connected on this air conduit 58 is made to conduct a switching operation in accordance with the control signal of an air pressure control unit 63. With this arrangement, the working air chamber 52 is alternatively connectable to the atmosphere or a vacuum source 62 based on the switching operation of the switch valve 60, whereby the atmospheric pressure and negative pressure are alternatively exerted to the working air chamber 52. Thus, the internal pressure of the working air chamber 52 becomes switchable thereby. As evident from above, in this embodiment, an air pressure passage connected to the working air chamber 52 for externally controlling the pressure of the working air chamber 52 comprises the air passage 54 and the air conduit 58, while the air pressure control means for exerting air pressure fluctuation to the working air chamber 52 comprises the air pressure control unit 63 and the switch valve 60.

For the vacuum source 62, a vacuum tank and an air intake system of the power unit may be employed, for example. An electromagnetic switch valve may be employed as the switch valve 60. Under control of the air pressure control unit 63, the electromagnetic switch valve is operated to conduct switching operations with a control signal corresponding to the vibration to be damped, thereby favorably providing a structure which alternatively communicates the working air chamber 52 with the vacuum source 62 and the atmosphere. With this regards, generation of the control signal of the electromagnetic switch valve in the air pressure control unit 63 may be carried out, for example, by detecting the engine speed, acceleration opening, running speed and the like by means of various sensors, while making sure that the air pressure fluctuation having the cycle, phase and amplitude corresponding to the vibration to be isolated is exerted to the working air chamber 52 on the basis of adaptive control or map control with the ignition signal of the engine as the reference signal.

Further, a partition plate 64 having an overall discoid shape is housed in the primary fluid chamber 38 formed between the opposing faces of the elastic body 16 and the partition member 36. This partition plate 64 is defined by mutually superimposed and fixing upper and lower partition plates 66, 68 respectively having a discoid shape and made of hard materials such as metal or synthetic resin, and is disposed in a state of being extending perpendicular to the axis of the second mounting member 14. As a result of the outer peripheral edge of the partition plate 64 being sandwiched and retained between the shoulder portion 26 of the second mounting member 14 and the axial end face of the elastic body 16, the partition plate 64 is fixed to the second mounting member 14. Thereby, the primary fluid chamber 38 is fluid-tightly partitioned into two regions situated on the elastic body 16 side and the partition member 36 side with the partition plate 64 therebetween. Formed between the elastic body 16 and the partition plate 64 is a pressure-receiving chamber 70 partially defined by the elastic body 16 and subjected to pressure changes accompanying elastic deformation of the elastic body 16 upon the input of vibrations. On the other hand, formed between the partition plate 64 and the partition member 36 is an oscillating chamber 72 partially defined by the oscillating rubber elastic plate 48 and subjected directly to pressure fluctuation as a result of the oscillating rubber elastic plate 48 oscillating based on the air pressure fluctuation of the working air chamber 52. As is apparent from the foregoing explanation, in the present embodiment, the first partition member is formed from the partition plate 64 composed of the upper and lower partition plates 66,68, and the second partition member is formed by the partition member 36.

The partition member 36 is provided with an outer circumferential groove 74 circumferentially extending for a prescribed length is formed at an axially intermediate portion thereof, while being open in the outer circumferential surface of the partition member 36. With the opening of the outer circumferential groove 74 being fluid-tightly closed by the small diameter portion 30 of the second mounting member, there is provided a fluid passage. One end of the fluid passage is open to the outer peripheral side of the central recess 44 in the upper end face of the partition member 36 via a through hole 76 extending axially. The other end of the fluid passage formed with the outer circumferential groove 74 is open to the lower recess 42 via a communication hole (not shown) extending radially inward. Still further, an annular groove 78 having a channel cross section opening upward and extending circumferentially is formed on the outer peripheral edge of the lower partition plate 68. In the portion where this annular groove 78 facing downward is formed, the lower partition plate 68 is fluid-tightly engaged with and fixed to the cylindrical fixture 50, and the annular groove 78 is closed by the upper partition plate 66, whereby a circular passage is formed. This circular passage formed with this annular groove 78 is connected to the pressure-receiving chamber 70 via a communication hole 80 extending through the upper partition plate 66 in one of two portions mutually opposed in a diametric direction. In the other portion, the circular passage is connected to the fluid passage formed with the outer circumferential groove 74 through a hole 82 formed through the lower partition plate 68, and is connected to the oscillating chamber 72 via a communication hole 84 extending through the center portion in the circumferential direction of the annular groove 78.

With this arrangement, the circular passage formed with the annular groove 78 and the fluid passage formed with the outer circumferential groove 74 are mutually connected serially so as to form a first orifice passage 86 for mutually communicating the pressure receiving chamber 70 and the equilibrium chamber 40. In addition, a second orifice passage 88 for mutually communicating the pressure receiving chamber 70 and the oscillating chamber 72 is formed with the circular passage. In other words, this second orifice passage 88 is formed by utilizing a part of the first orifice passage 86 upon the first orifice passage 86 being connected to the oscillating chamber 72 at the center portion in the longitudinal direction of the passage.

When pressure fluctuation is generated in the pressure receiving chamber 70 based on the elatsic deformation of the elastic body 16 upon input of vibrations, fluid is made to flow between the chambers 70, 40 via the first orifice passage 86 based on the relative pressure difference between the pressure receiving chamber 70 and the equilibrium chamber 40. Particularly, in the present embodiment, the first orifice passage 86 is tuned to a low-frequency large-amplitude vibration frequency range of roughly 10 Hz, for example, which corresponds to an engine shake. Therefore, passive vibration isolating effects are provided based on the resonance or flow action of the fluid flowing through the first orifice passage 86 in relation to the input vibration of a low-frequency range.

The second orifice passage 88 is tuned to a medium-frequency medium-amplitude vibration frequency range of about 30 to 50 Hz, for instance, corresponding to the idling vibration in a vehicle idling state. Upon the input of vibrations of a medium-frequency range, the switch valve 60 on the air conduit 58 is repeatedly switched at a cycle and phase corresponding to the idling vibration, whereby air pressure fluctuation is applied to the working air chamber 52 with the amplitude corresponding to the pressure difference of the atmospheric pressure and the vacuum source 62. This air pressure fluctuation generated in the working air chamber 52 causes fluid pressure fluctuation in the oscillating chamber 72. This fluid pressure fluctuation generated in the oscillating chamber 72, is effectively exerted to the pressure receiving chamber 70 with the help of resonance or flow action of the fluid flowing through the second orifice passage 88, whereby active vibration damping effects are exhibited by positively adjusting the pressure fluctuation of the pressure receiving chamber 70.

Tuning of the first and second orifice passages 86, 88 may be carried out, for instance, by and adjusting the length and cross sectional area of the passage, in consideration of the wall spring rigidity (characteristic value corresponding to the pressure change amount required for changing in the amount of unit capacity) of the pressure receiving chamber 70, equilibrium chamber 40 or oscillating chamber 72. Generally, the frequency in which the phase of the pressure fluctuation transmitted via the orifice passages 86, 88 changes and causes resonance of the fluid, may be comprehended as the tuning frequency of such orifice passages 86, 86.

Further, a large diameter aperture 90 is formed in the center portion of the upper and lower partition plates 66, 68 structuring the partition plate 64, respectively, and a partition rubber plate 92 is disposed inside this aperture 90. This partition rubber plate 92 has a thin discoid shape and a fitting rubber 94 extending in a fixed spherical cross section across the entire circumferential direction is integrally formed to the outer peripheral edge thereof. As a result of the upper and lower partition plates 66, 68 being mutually spaced at the inner peripheral edges thereof, a fitting groove 96 opening radially inward is consecutively formed across the entire circumferential direction at the inner circumferential edge of the aperture 90. With the fitting rubber 94 being fitted into the fitting groove 96, the upper and lower partition plates 66, 68 are fluid-tightly caulk-fixed such that the partition rubber plate 92 is built in the partition plate 64 so as to spread perpendicular to the axis. With this arrangement, the pressure-receiving chamber 70 formed on one side of the axial direction and the oscillating chamber 72 formed on the other side are fluid-tightly partitioned with the partition rubber plate 92 therebetween.

In the present embodiment, particularly, the partition rubber plate 92 defining a part of a separate portion of the pressure receiving chamber 70, is tuned to exhibit the pressure fluctuation absorption of the pressure receiving chamber 70 in a high-frequency small-amplitude vibration frequency range of about 50 to 200 Hz, for instance, corresponding to booming noises during the vehicle running state, and the expansion spring of the partition rubber plate 92 is made to be larger than that of the oscillating rubber elastic plate 48.

With the engine mount 10 of construction according to the present embodiment defined as described above, upon the vibration input of a low-frequency range such as engine shakes, as described above, as a result of high damping or attenuation effects being exhibited based on resonance of the fluid flowing between the pressure receiving chamber 70 and the equilibrium chamber 40 via the first orifice passage 86, thereby exhibiting vibration damping performance effective against such low-frequency large-amplitude vibrations are yielded.

During input of vibrations of a medium-frequency range such as idling vibrations, air pressure fluctuation is applied to the working air chamber 52 with the amplitude corresponding to the pressure difference of the atmospheric pressure and the vacuum source 62 pursuant to the switch valve 60 being repeatedly switched at the cycle and phase according to the idling vibration. When pressure fluctuation is generated in the oscillating chamber 72 as a result of the oscillation of the oscillating rubber elastic plate 48, fluid is forced to flow through the second orifice passage 88 based on the relative pressure difference of the pressure receiving chamber 70 and the oscillating chamber 72. That is, pressure fluctuation of the oscillating chamber 72 is effectively exerted to the pressure receiving chamber 70 with the help of resonance of the fluid flowing through the second orifice passage 88 so that the pressure receiving chamber 70 is actively pressure controlled. As a result, relative or positive vibration damping effects are exhibited against vibrations input across the first mounting member 12 and the second mounting member 14. In addition, since the second orifice passage 88 is tuned in consideration of the idling vibration, the flow resistance against high-frequency range vibrations will become significantly strong due to antiresonant behavior or the like, whereby pressure transmission of a high-frequency range from the oscillating chamber 72 to the pressure receiving chamber 70 will be substantially suppressed, and a desired filter effect may be exhibited.

Accordingly, in a case of employing a pneumatic actuator without adopting an electromagnetic actuator capable of high precision control of input vibrations and correspondence as the generated oscillatory force, transmission of the higher harmonic components among the rectangular waveform pressure fluctuations generated in the oscillating chamber 72 will be reduced by the second orifice passage 88, and a primary component corresponding to the vibration to be damped can be exerted to the pressure receiving chamber 70 with high precision, and further advantageous active vibration damping effects against the target idling vibration can be exhibited thereby.

Another advantage of the embodiment is that the expansion spring or wall spring rigidity of the partition rubber plate 92 is made to be larger than that of the oscillating rubber elastic plate 48, and the active vibration isolating effects against idling vibrations will be effectively exhibited without being reduced by the partition rubber plate 92.

Yet another advantage of the embodiment is that even during the input of low-frequency large-amplitude vibrations, since the pressure fluctuation amplitude of the pressure receiving chamber 70 is increased, elastic deformation of the partition rubber plate 92 having strong spring rigidity is restricted based on the elasticity thereof, and the pressure fluctuation of the pressure receiving chamber 70 accompanying the vibration input can be prevented from being absorbed by the elastic deformation of the partition rubber plate 92. This makes it possible to obtain a sufficient amount of fluid flow through the first orifice passage 86, thus exhibiting high vibration-damping effects against low-frequency large-amplitude vibrations.

Although the first orifice passage 86 becomes substantially in a closed state for input vibrations in a high-frequency range such as booming noises during the vehicle running state, since the amplitude of the high-frequency vibration is sufficiently small, the pressure fluctuation of the pressure receiving chamber 70 induced pursuant to the high-frequency vibration will be reduced based on the elastic deformation of the partition rubber plate 92 structuring a part of the wall portion of the pressure receiving chamber 70. This makes it possible for the engine mount 10 to exhibit active vibration isolating effect on the basis of low dynamic spring constant thereof. Moreover, during the running of the vehicle where high-frequency vibrations such as booming noises and low-frequency vibrations such as engine shakes are exerted, the working air chamber 52 will be maintained in the atmospheric pressure either by controlling the switch valve 60 with the air pressure control unit 63 so as to place the working air chamber 52 in a state of communication with the atmosphere, or by closing the switch valve 60 and making the working air chamber 52 in a hermetically sealed state at an atmospheric pressure.

Thus, with the engine mount 10 of the present embodiment, as a result of employing a pneumatic actuator, a simple and compact overall structure with few components of the engine mount is realized, and effective vibration damping performances are generated by suitably adopting active vibration damping effects and passive vibration damping effects against vibrations across a wide frequency range from low-frequency bands to medium-frequency bands and high-frequency bands.

While the invention has been shown and described in detail hereinabove with reference to certain preferred embodiment, for illustrative purpose only, it is to be understood that the invention is not limited to the details of the illustrated embodiment.

For instance, the respective tuning frequencies of the first orifice passage 86 and second orifice passage 88 may be suitably set in accordance with the required damping characteristics, and, it should be understood that there is no limitation to such tuning frequency.

Still further, the specific constitution of the first orifice passage 86 and the second orifice passage 88 is not limited in any way, and may be suitably changed in consideration of the mount structure, mount size, and other factors. While the first orifice passage 86 was utilized to form the second orifice passage 88 in the illustrated embodiment, such first orifice passage 86 and second orifice passage 88 may be formed to have mutually independent passage structures.

Additionally, while the engine mount for automotive vehicles has been described as one preferred embodiment of the invention, the principle of the present invention may be equally applicable to various vibration damping devices for use in various vibrative members requiring vibration isolating effects against vibrations across a plurality or a wide range of frequency bands.

EXAMPLE

In order to further specifically clarify the automotive fluid-filled engine mount according to the present invention, a practical example of the present invention is described below, by way of example, but the present invention shall in no way be limited thereto.

Foremost, an engine mount 10 as depicted in the foregoing embodiments was prepared as the practical example, and an engine mount in which the overall bulkhead of the pressure receiving chamber 70 and the oscillating chamber 72 as the rigid member, without providing the aperture 90 to the partition plate 64 in the engine mount 10, was prepared as the comparative example. The passive vibration damping characteristics were experimentally measured for the practical example and the comparative example, respectively. The results of measurements are shown in FIG. 2. During this experiment, the absolute spring constant upon oscillating the first and second mounting members 12, 14 in the axial direction was measured under a condition of exerting an initial load corresponding to the support load or weight of the power unit between the first mounting member 12 and the second mounting member 14.

The results of FIG. 2 shows that the engine mount 10 as the practical example is able to exhibit passive vibration isolation effects in a high-frequency range exceeding the idling frequency extremely sufficiently in comparison to the engine mount of the comparative example to which a partition rubber plate 92 is not provided.

Figure 3:
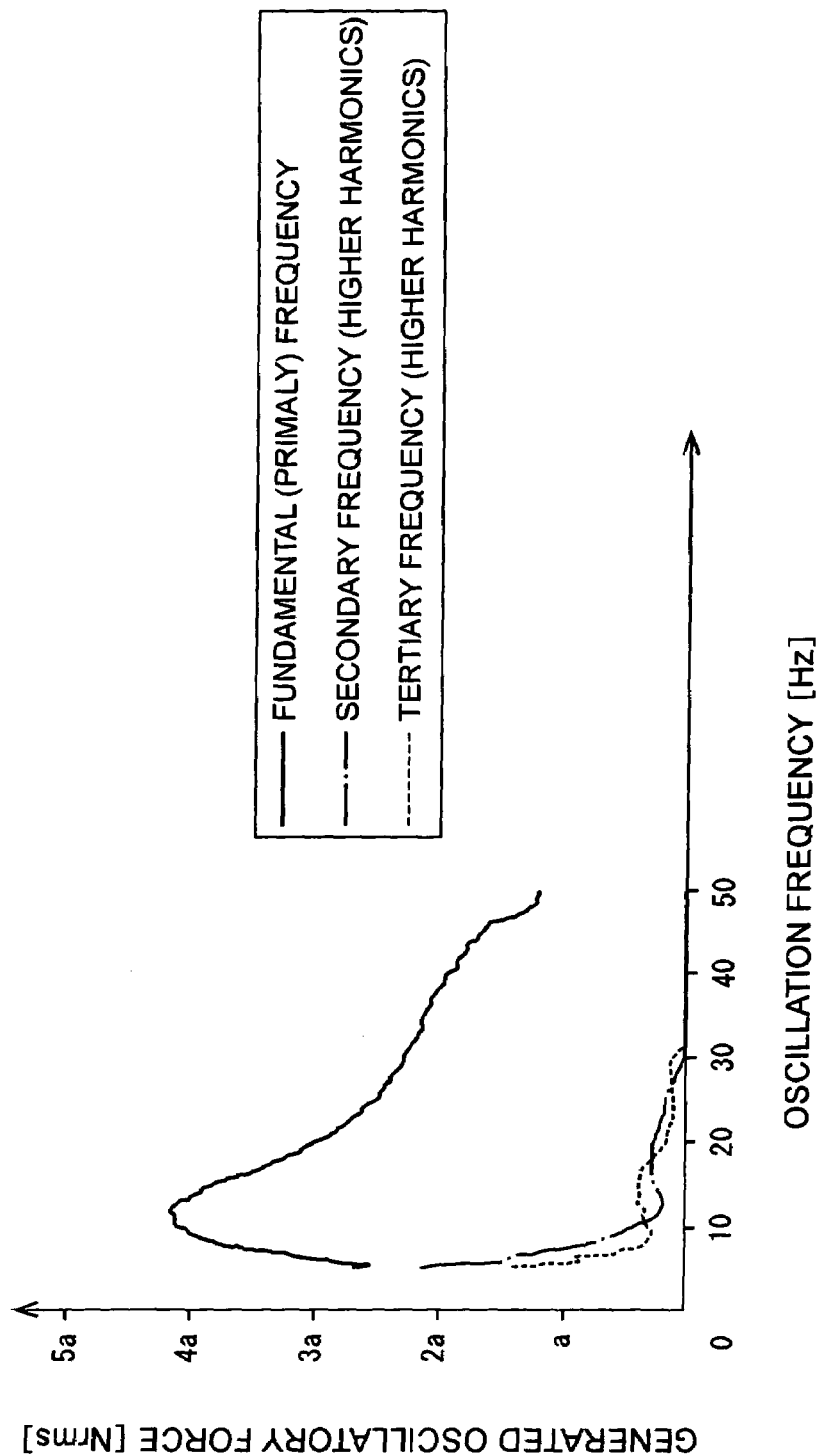
FIG. 3 is a graph showing active damping characteristics of the engine mount of FIG. 1, together with that of the comparative example.

Further, the active vibration damping characteristics of the engine mount 10 in the present embodiment were also measured. The results are shown in FIG. 3. During this experiment, the cycle for switching the switch valve 60 was changed from a low-frequency range to a high-frequency range under a condition of exerting the initial load corresponding to the support load or weight of the power unit between the first and second mounting members 12, 14 in order to examine the relationship between the generated oscillatory force and oscillation frequency upon exerting pressure fluctuation to the working air chamber 52 with an amplitude corresponding to the pressure difference of the atmospheric pressure and vacuum source.

The results of FIG. 3 shows that the transmissive force of the generated oscillatory force of the higher harmonic components (secondary and tertiary) of the oscillation frequency has been suppressed sufficiently low in the high-frequency range exceeding approximately 30 Hz, which is the tuning frequency of the second orifice passage 88.

Thus, deterioration of vibrations in a frequency range of a high order resulting from the transmission of higher harmonic components can be avoided. In the idling frequency range (about 30 to 50 Hz), large oscillatory force is efficiently exhibited, and it is acknowledged that active vibration isolation effects are effectively exhibited.

What is claimed is:

1. A fluid filled engine mount for an automotive vehicle, comprising:
   a first mounting member fixable to a power unit side of the vehicle;
   a second mounting member fixable to a body side of the vehicle, and disposed spaced away from the first mounting member;
   an elastic body for elastically connecting the first mounting member and the second mounting member;
   a pressure receiving chamber filled with non-compressible fluid and partially defined by the elastic body so as to excite fluid pressure fluctuation upon input of vibration;
   an equilibrium chamber filled with the non-compressible fluid and partially defined by a flexible layer so as to permit change in volume;
   a first orifice passage for connecting die equilibrium chamber to the pressure receiving chamber, and tuned so as to excite resonance of the fluid flowing therethrough between the pressure receiving and the equilibrium chambers in a vibration frequency range of a low-frequency large-amplitude;
   a partition rubber plate partially defining at a first surface thereof the pressure receiving chamber so that the partition rubber plate directly faces the pressure receiving chamber, and tuned so as to perform absorption of the fluid pressure fluctuation of the pressure receiving chamber in a vibration frequency range of a high-frequency small-amplitude during a vehicle running state, while partially defining at an other surface thereof an oscillating chamber filled with the non-compressible fluid formed on an opposite side from the pressure receiving chamber with the partition rubber plate interposed therebetween;
   a second orifice passage for connecting the oscillating chamber to the pressure receiving chamber, and tuned so as to excite resonance of the fluid flowing therethrough between the oscillating chamber and the pressure receiving chamber in a vibration frequency range of a medium-frequency medium-amplitude;
   an oscillating rubber elastic plate having an expansion spring smaller than that of the partition rubber plate and partially defining at a first surface thereof the oscillating chamber, while partially defining at an other surface thereof a working air chamber formed on an opposite side from the oscillating chamber with the oscillating rubber elastic plate interposed therebetween;
   an air pressure passage connected to the working air chamber for externally controlling air pressure in the working air chamber;
   an air pressure control unit for controlling the air pressure exerted to the working air chamber through the air pressure passage so as to exert air pressure fluctuation to the working air chamber with a frequency corresponding to an idling vibration during a vehicle idling state, and make the working air chamber an approximate atmospheric pressure during the vehicle running state; and
   wherein the partition rubber plate fluid-tightly partitions the pressure receiving chamber and the oscillating chamber from each other, and the partition rubber plate and the oscillating rubber elastic plate are spaced away from each other to be movable independently from each other.

2. A fluid-filled engine mount according to claim 1, wherein the second mounting member is formed as a cylindrical body, the first mounting member is disposed spaced away from one of opposite openings of the second mounting member, the first mounting member and second mounting member are connected with the elastic body so as to fluid-rightly close the one of the opposite openings of the second mounting member and to fluid-tightly close an other one of the opposite openings of the second mounting member with the flexible layer, the engine mount further comprising: a first partition member and a second partition member mutually superimposed in the axial direction inside the second mounting member and securely supported with the second mounting member so as to form the pressure receiving chamber between the first partition member and the elastic body and to form the equilibrium chamber between the second partition member and the flexible layer, wherein a recess provided to a superimposing face side of the second partition member in relation to the first partition member is fluid-tightly closed with the oscillating rubber elastic plate so as to form the working air chamber and to form the oscillating chamber between the oscillating rubber elastic plate and the first partition member; and an aperture provided to the first partition member for partitioning the oscillating chamber and the pressure receiving chamber is fluid-tightly blocked with the partition rubber plate.

3. A fluid filled engine mount for an automotive vehicle according to claim 1, wherein the pressure receiving chamber, the oscillating chamber and the working air chamber are axially arranged in this order from a side of the first mounting member.

* * * * *